July 13, 1954
J. R. PARSONS
2,683,851
FREQUENCY-PHASE CONVERTER WITH INDUCTIVE CURRENT CONTROL
Filed April 15, 1949
10 Sheets-Sheet 1
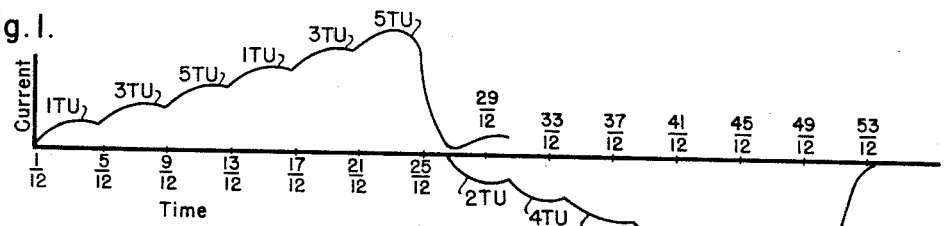
Fig. 1.
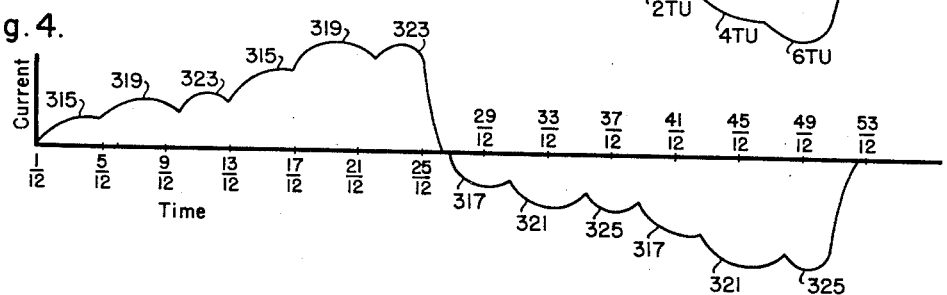
Fig. 4.
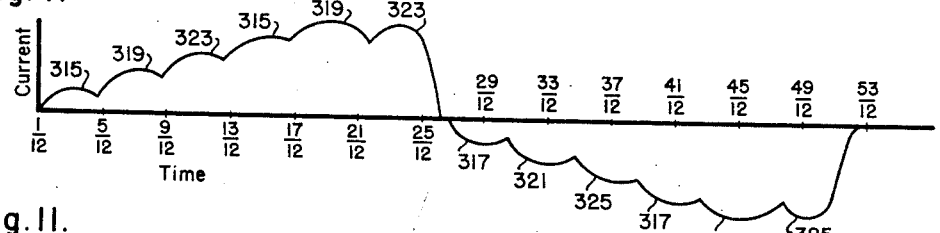
Fig. 7.
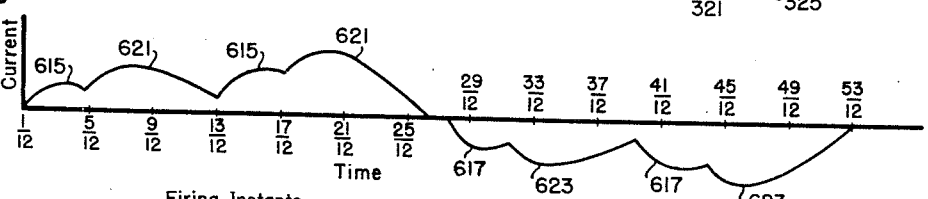
Fig. 11.
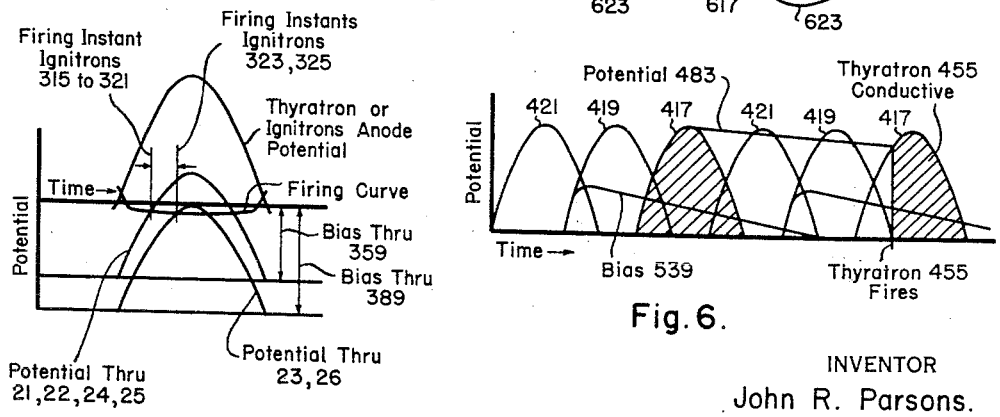
Fig. 3.
Fig. 6.
INVENTOR
John R. Parsons.
BY
*Hymen Diamond*
ATTORNEY

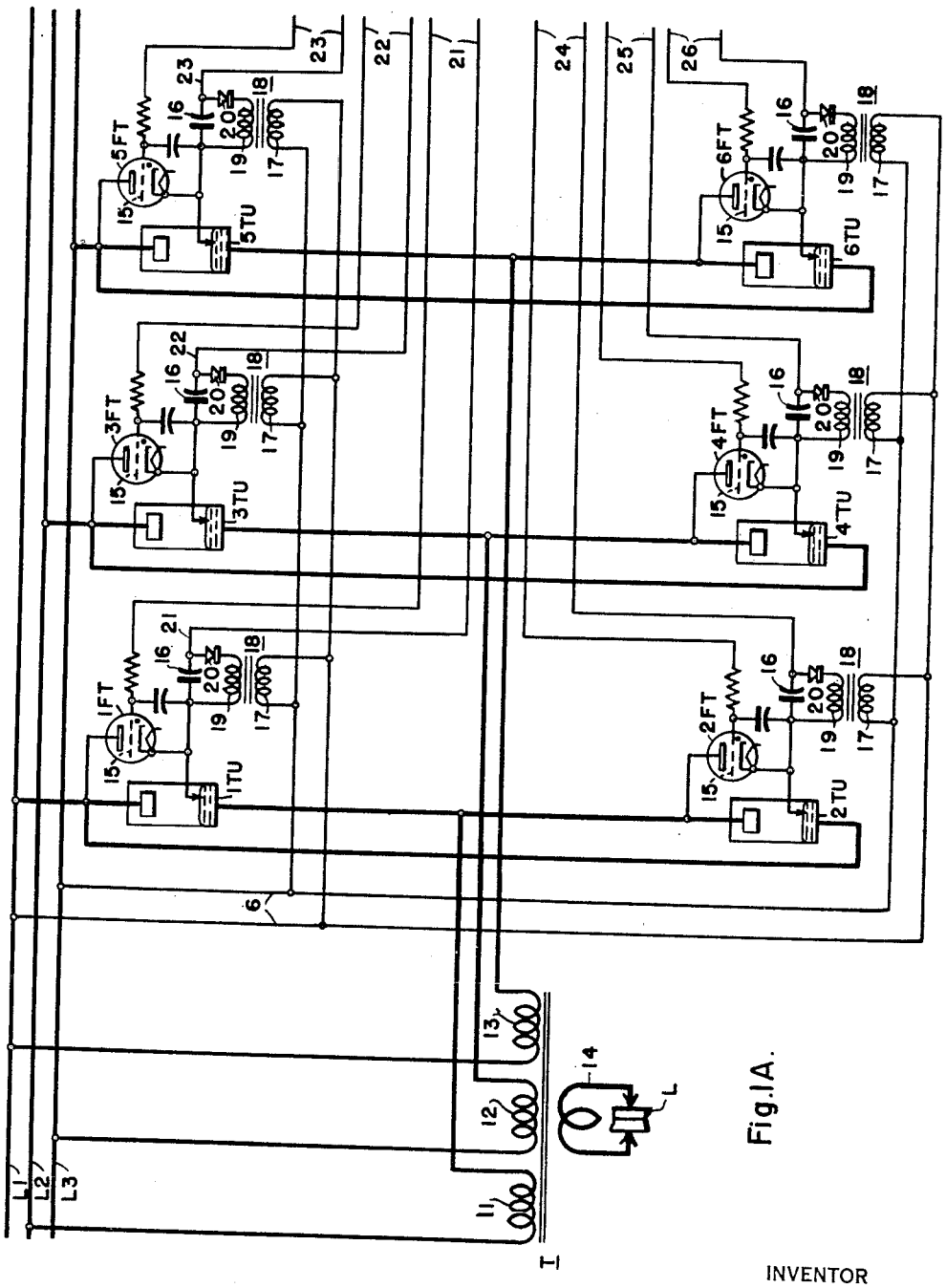
Fig. IA.

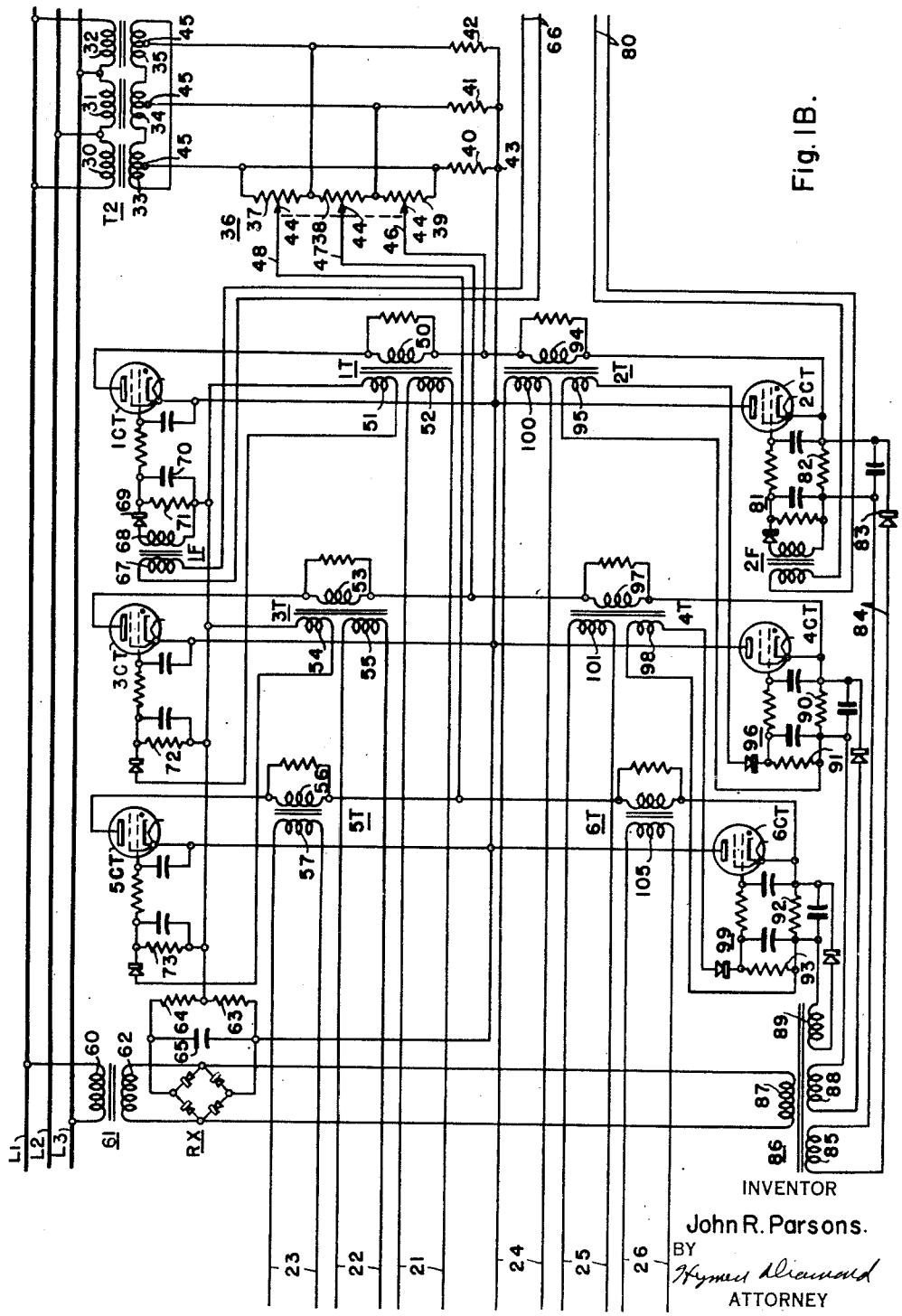
Fig. IB.
INVENTOR
John R. Parsons.
BY
ATTORNEY

July 13, 1954
J. R. PARSONS
2,683,851
FREQUENCY-PHASE CONVERTER WITH
INDUCTIVE CURRENT CONTROL
Filed April 15, 1949
10 Sheets-Sheet 4
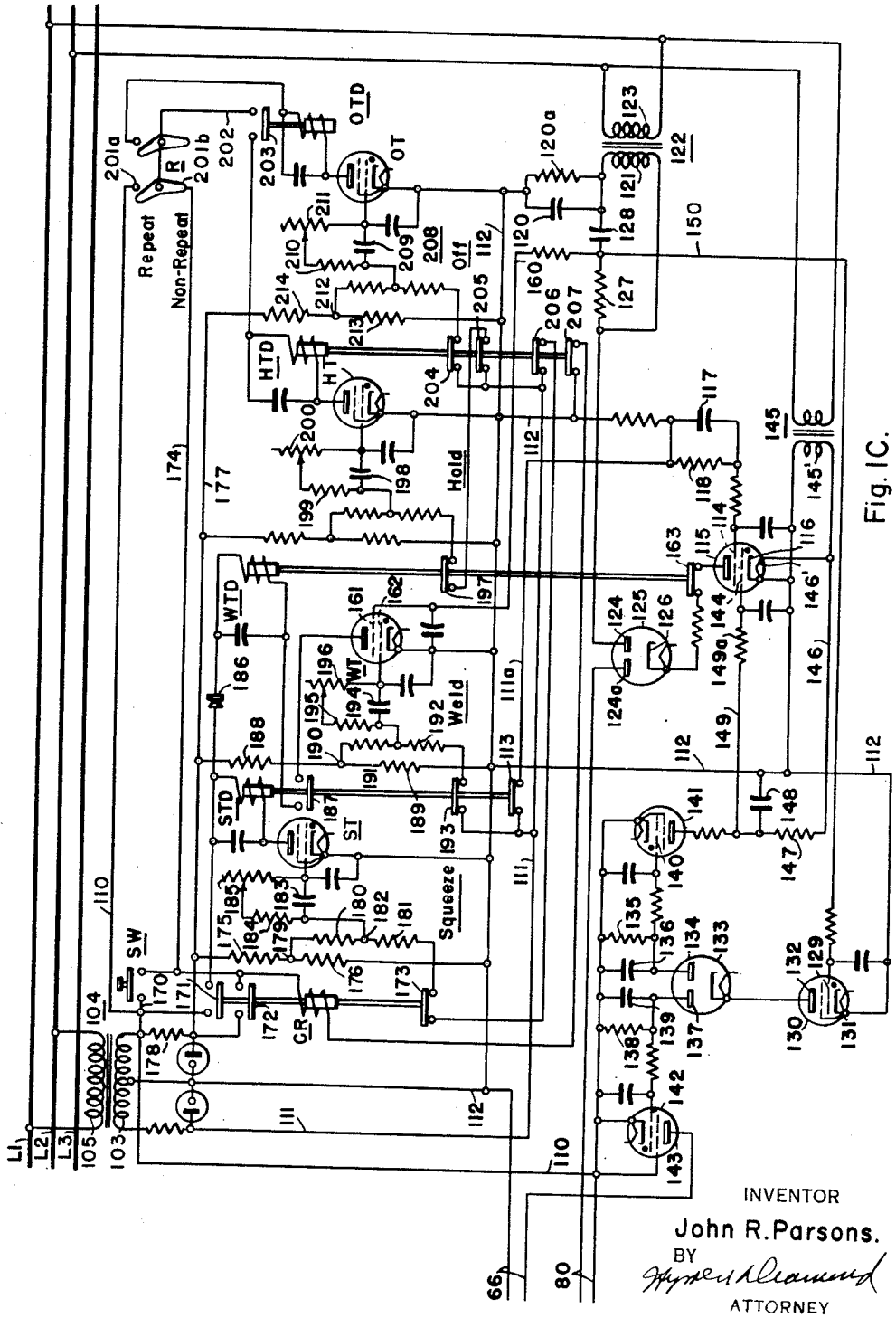
Fig. IC.
INVENTOR
John R. Parsons.
BY
ATTORNEY INVENTOR
John R. Parsons.
BY
Hymen Diamond.
ATTORNEY July 13, 1954

J. R. PARSONS 2,683,851

FREQUENCY-PHASE CONVERTER WITH INDUCTIVE CURRENT CONTROL

Filed April 15, 1949

WITNESSES:
Robert C. Baird
Nw. C. Groome

INVENTOR
John R. Parsons.
BY
Hymen Diamond.
ATTORNEY

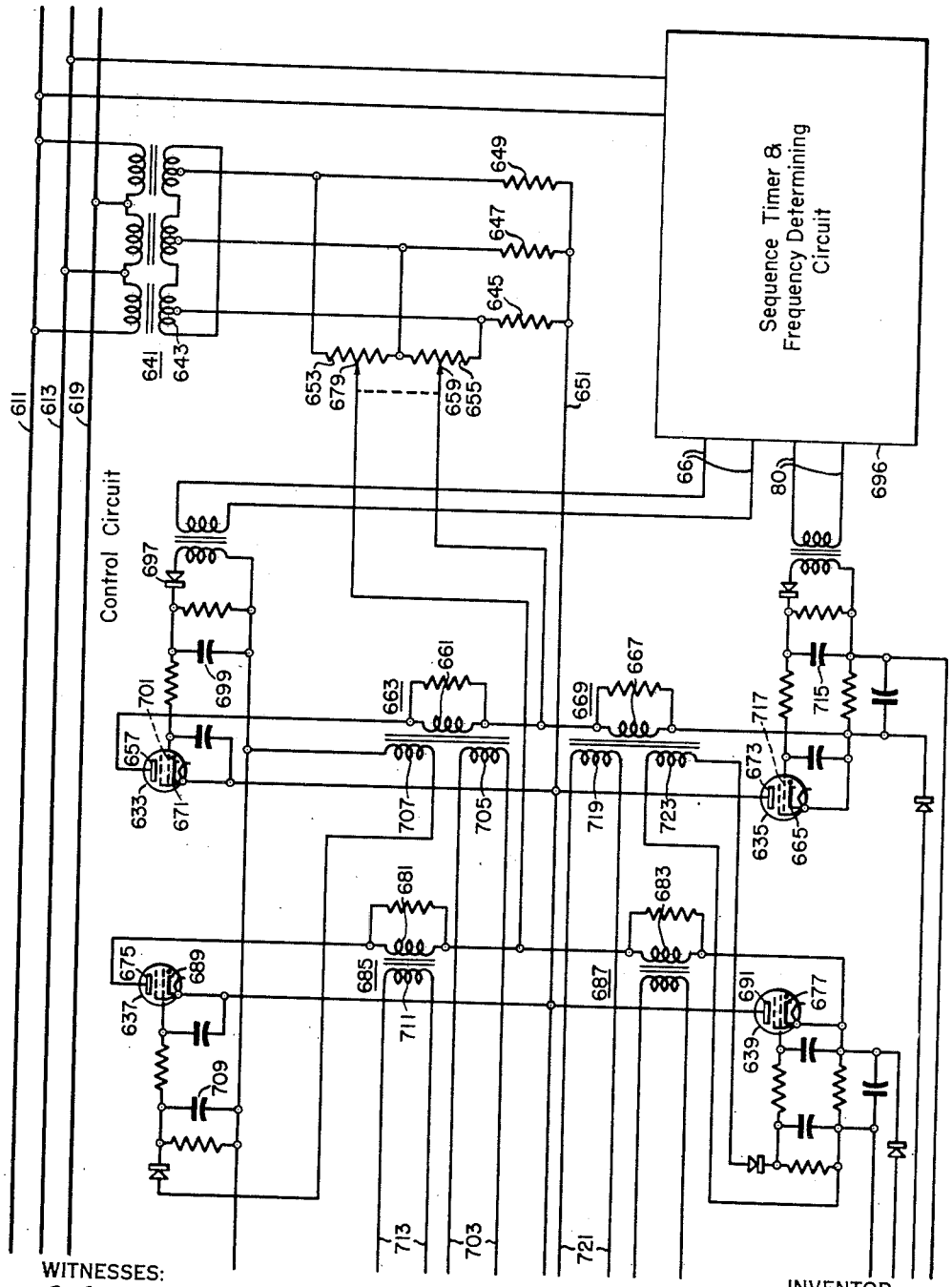
Fig. IOA.

Patented July 13, 1954

2,683,851

UNITED STATES PATENT OFFICE 2,683,851

FREQUENCY-PHASE CONVERTER WITH INDUCTIVE CURRENT CONTROL

John R. Parsons, Kenmore, N. Y., assignor to Westinghouse Electric Corporation, East Pittsburgh, Pa., a corporation of Pennsylvania Application April 15, 1949, Serial No. 87,714

15 Claims. (Cl. 321—7)

My invention relates to electric discharge apparatus and it has particular relation to resistance welding apparatus. Application Serial No. 384,703 is a division of the present application. The invention is an outgrowth of my experience with low frequency welding apparatus of the type disclosed in the following patents, all of which are assigned to Westinghouse Electric Corporation:

| Patent No. | Inventor | Date |
|---|---|---|
| 2,640,180 | J. R. Parsons | May 26, 1953. |
| 2,619,591 | J. R. Parsons | November 25, 1952. |
| 2,510,652 | C. B. Stadum and J. R. Parsons. | June 6, 1950. |
| 2,508,467 | E. C. Hartwig and J. R. Parsons. | May 23, 1950. |

The above-listed applications relate to welding systems in which power is derived from an alternating current commercial supply and supplied to a load such as a welding transformer at a substantially lower frequency than that of the supply. The supply may be of the single-phase or polyphase type. The conversion from the commercial frequency to the lower frequency is effected by operation of electric discharge valves, usually ignitrons, interposed between the supply buses and the primary of the welding transformer. Preferably, the ignitrons are subdivided into pairs, each pair being connected in anti-parallel to a section of the primary of the welding transformer and each section and its associated pairs being connected across a pair of buses of the supply. The individual ignitrons of the pairs are so controlled that first current of one polarity is built up in the welding transformer and permitted to decay, and immediately thereafter current of the opposite polarity is built up and permitted to decay. The ignitrons of each pair which conduct the current of each polarity I will designate a group. In the systems shown in Patents 2,640,180, 2,619,591 and 2,508,467 there are three ignitrons in each group. In the system shown in Patent 2,510,652 there are two ignitrons in each group.

In operating apparatus of this type, I have found that it is on the whole satisfactory. I have, however, encountered situations in which certain of the ignitrons have a relatively short life in operation. In such situations the ignitrons are severely damaged after the apparatus is operated for only a short time; sometimes the damage is so severe that the ignitrons must be replaced. In addition the load may also be damaged. In particular, I have found that such difficulties arise when the apparatus is operated with a load having a low power factor such as arises when the welding electrodes are short-circuited for test purposes.

It is, accordingly, an object of my invention to provide a low frequency welding system of the electronic type in which the electric discharge valves conducting the load current shall operate without becoming seriously impaired in a short time.

Another object of my invention is to provide welding apparatus including electric discharge valves through which the load current is supplied which shall operate at a low power factor, such as is encountered when the welding electrodes are short-circuited, without serious impairment to the discharge valves.

Still another object of my invention is to provide an electronic control system for converting power derived from a commercial supply to a substantially lower frequency to be supplied to a load such as a welding transformer which shall operate over long periods of time without serious impairment to the electric discharge valves which conduct the load current.

A further object of my invention is to provide an electronic converter for deriving power from an alternating supply at a substantially lower frequency than that of the supply which shall operate to supply loads having power factors of the order of 20% without serious damage to the electric discharge valve which carry the load current.

A still further object of my invention is to provide an electronic converter for deriving power from an alternating supply at a substantially lower frequency than that of the supply which shall operate without damage to the load.

An ancillary object of my invention is to provide a novel control circuit for controlling the firing of the main discharge valves in systems such as are shown in the above-listed applications.

Still another ancillary object of my invention is to provide a converter of the type disclosed in the above-entitled Patents 2,640,180, 2,619,591 and 2,508,467 which shall include a substantially smaller number of main valves and control circuits for main valves than do the corresponding systems disclosed in the above-mentioned three applications and shall, for many purposes, afford as satisfactory service as the apparatus disclosed in said three applications.

My invention arises from the realization that one of the ignitrons of each of the groups of ignitrons included in the systems disclosed in the above-listed applications, fails to become extinguished at the end of its conductive period and continues to conduct for time intervals of substantial duration. It is these ignitrons which are damaged.

In operation of the systems disclosed in the above-listed applications, one ignitron of each pair of anti-parallel connected ignitrons, that is of each group, is rendered conductive when the bus to which its anode is connected becomes positive relative to the other buses, and conducts in its turn during a low frequency half period until the current built up in the load has the desired low frequency amplitude. The last ignitron of the group to conduct carries the maximum current. When this current is reached, the first ignitron of the conducting group is not again fired. As the current decays in the load, the last ignitron of the group continues to conduct. The current during the low frequency half period of the opposite polarity is now to be conducted by the other ignitrons of each pair. Each of the latter is rendered conductive in its turn, as the bus to which its anode is connected becomes more positive than the other buses of the supply. I have found that the damage to the ignitrons arises from the fact that when the first of the ignitrons which conducts the current of the reverse polarity is rendered conductive, the last of the ignitrons which conducts the current of the initial polarity is still conductive. The current conducted by the first ignitron to conduct the reverse current induces potential in the winding supplied from the last ignitron to conduct the current of the initial polarity in such a sense as to build up the decaying conductivity of this last ignitron. The latter, therefore, conducts for an excessively long interval. In addition the current supplied to its corresponding winding through the first ignitron of the new group is returned to the supply through the last ignitron of the old group. A short circuit is thus in effect produced. Because the last ignitron of the old group conducts for an excessively long interval under short circuit conditions it soon becomes hot, fails to deionize and carries current of both polarities continuously. The same condition arises as the last ignitron to conduct the reverse current continues conductive after the first ignitron to conduct the current of the initial polarity is rendered conductive during the succeeding low frequency half period. This phenomenon is more common at low power factors than at high power factors, and is particularly marked when the apparatus is operated with the welding electrodes short-circuited for test purposes.

In accordance with my invention, I provide apparatus in which the firing of the last of the valves of each group to conduct is initiated later in the periods of the supply than is the firing of the other valves. This delay may, in accordance with my invention, be introduced during each of the successive intervals during which this valve conducts during each low frequency half period, or it may be introduced only during one, preferably the last, of the intervals. In accordance with the broader aspects of my invention, this delay may also be introduced into one of the other valves than the last, or into several of the valves. By reason of the delay in the firing of the last valves to conduct, the build-up of the current in the load is somewhat reduced and the current through the last valve to conduct is interrupted before the first valve to conduct the current of the reverse polarity becomes conductive.

In accordance with another aspect of my invention, I provide a system in which the load is supplied from less than all of the phases of a polyphase supply. For example, the load may be supplied from only two phases of a three-phase supply. Under such conditions, the current in the load is built up in such manner that the excessive conductivity by certain valves described above is also avoided.

The novel features that I consider characteristic of my invention are set forth with particularity in the appended claims. The invention itself, however, both as to its organization and its method of operation, together with additional objects and advantages thereof, will be understood from the following description of a specific embodiment when read in connection with the accompanying drawings, in which:

Figure 1 is a graph illustrating the operation of prior art apparatus shown in Figs. 1A, 1B and 1C;

Figs. 1A, 1B, and 1C are Figs. 1, 2 and 3 of Patent 2,619,591 and are included to facilitate understanding of the invention hereof;

Fig. 3 is a graph illustrating the operation of the apparatus shown in Fig. 2;

Fig. 4 is a graph analogous to the graph shown in Fig. 1, but corresponding to the apparatus shown in Fig. 2;

Figure 5:
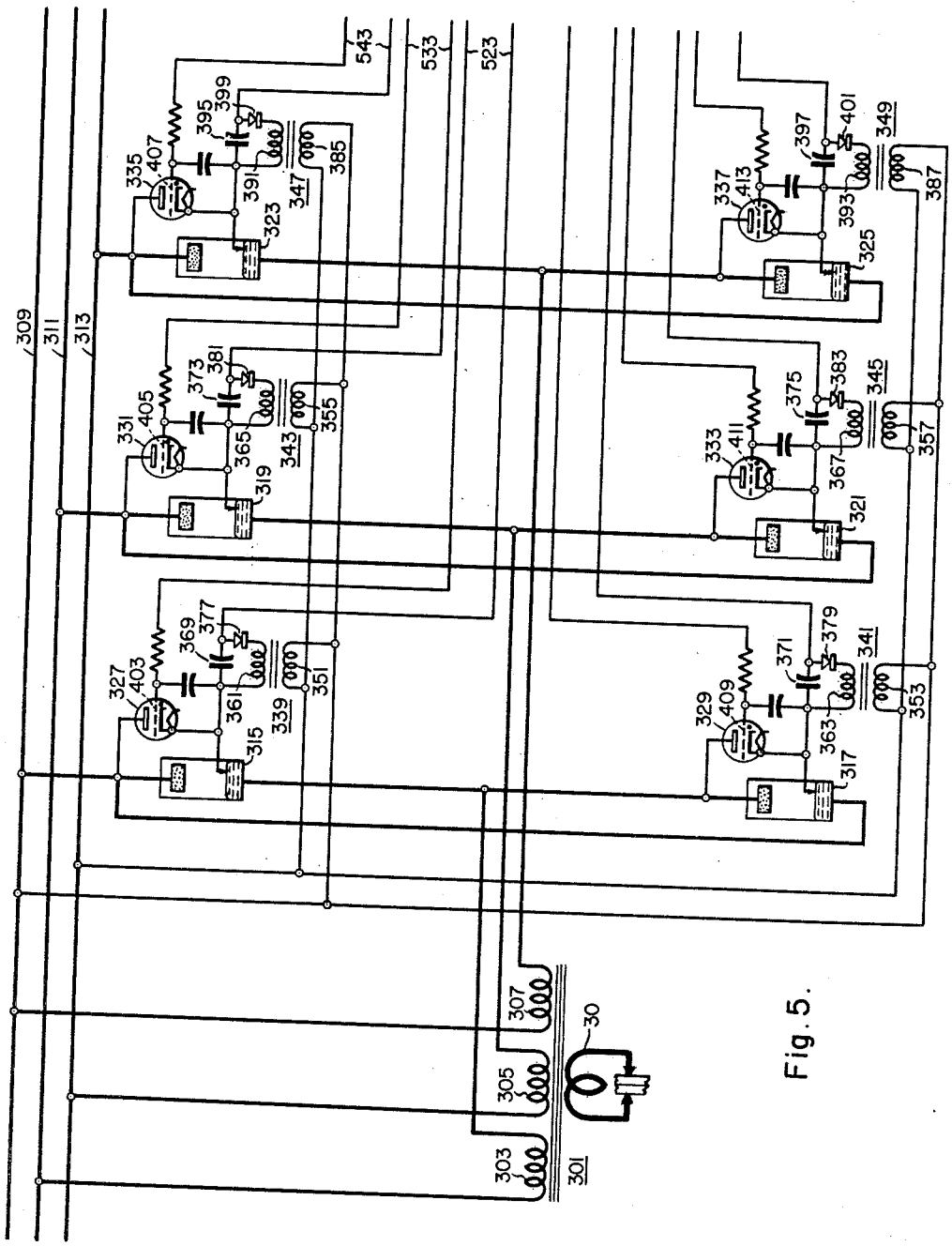
Figure 5A:
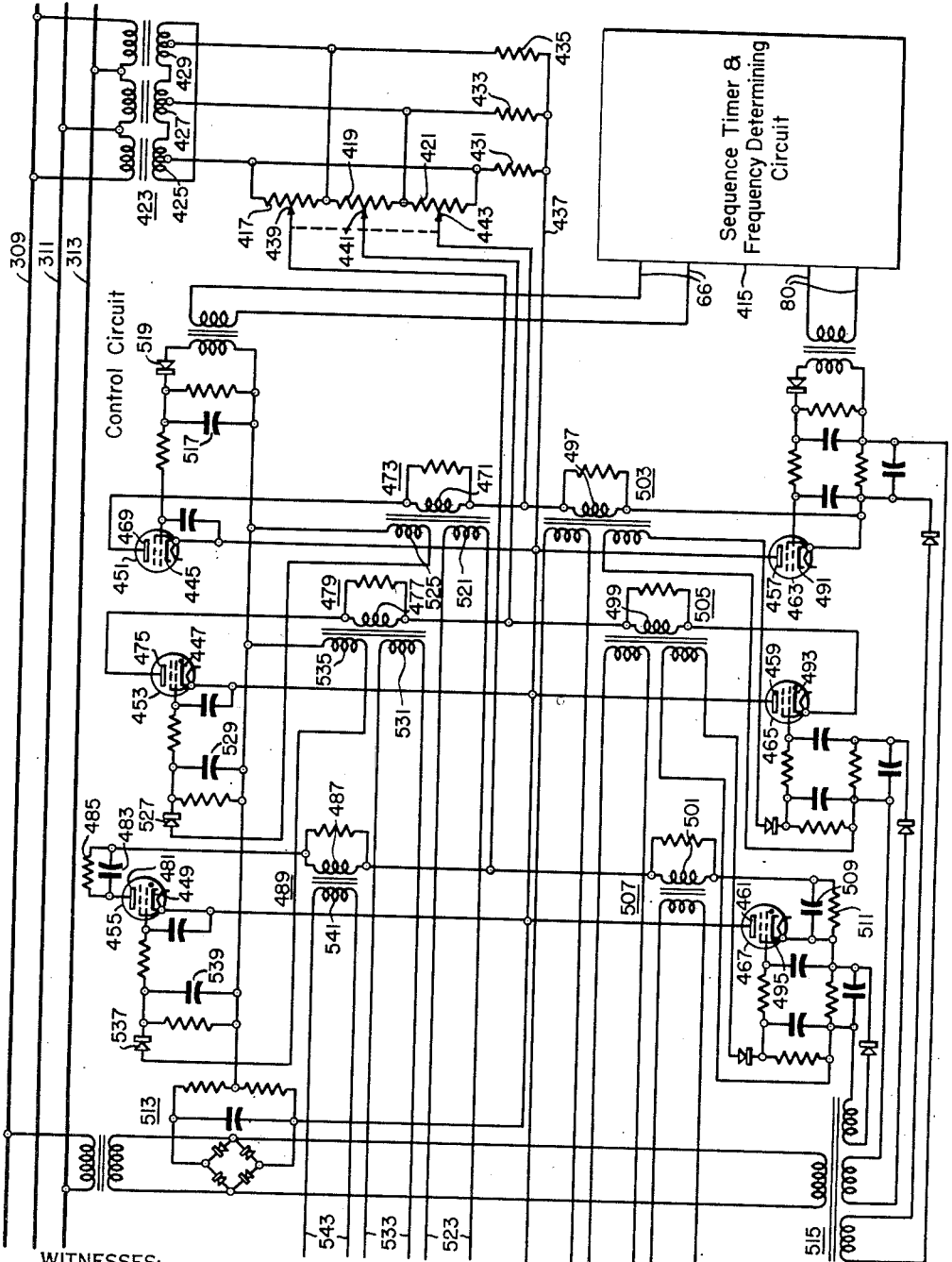
Figure 8:
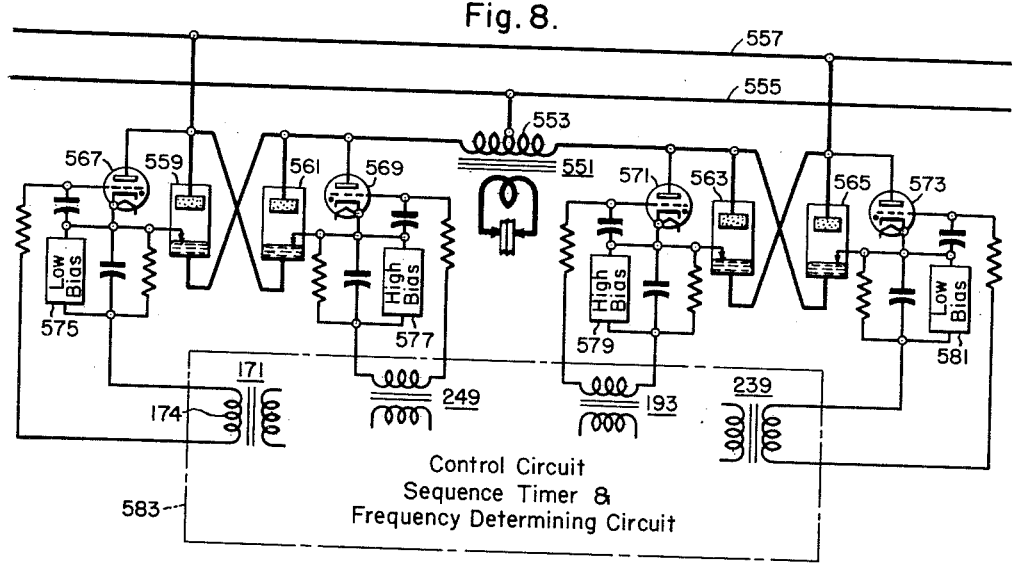
Figure 9:
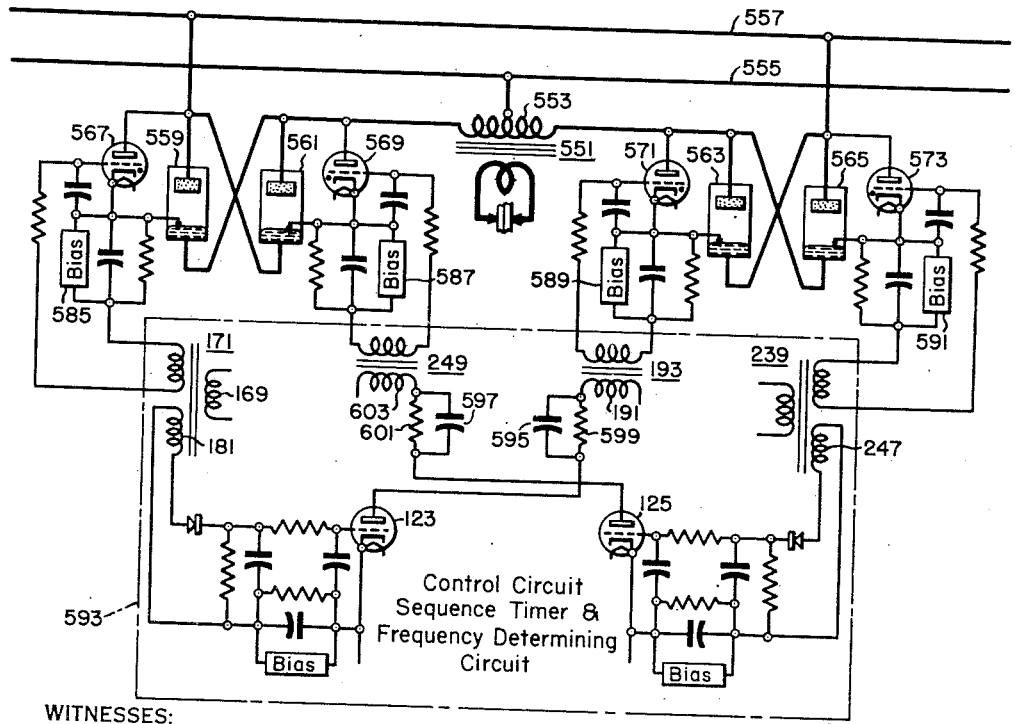
Figure 10:
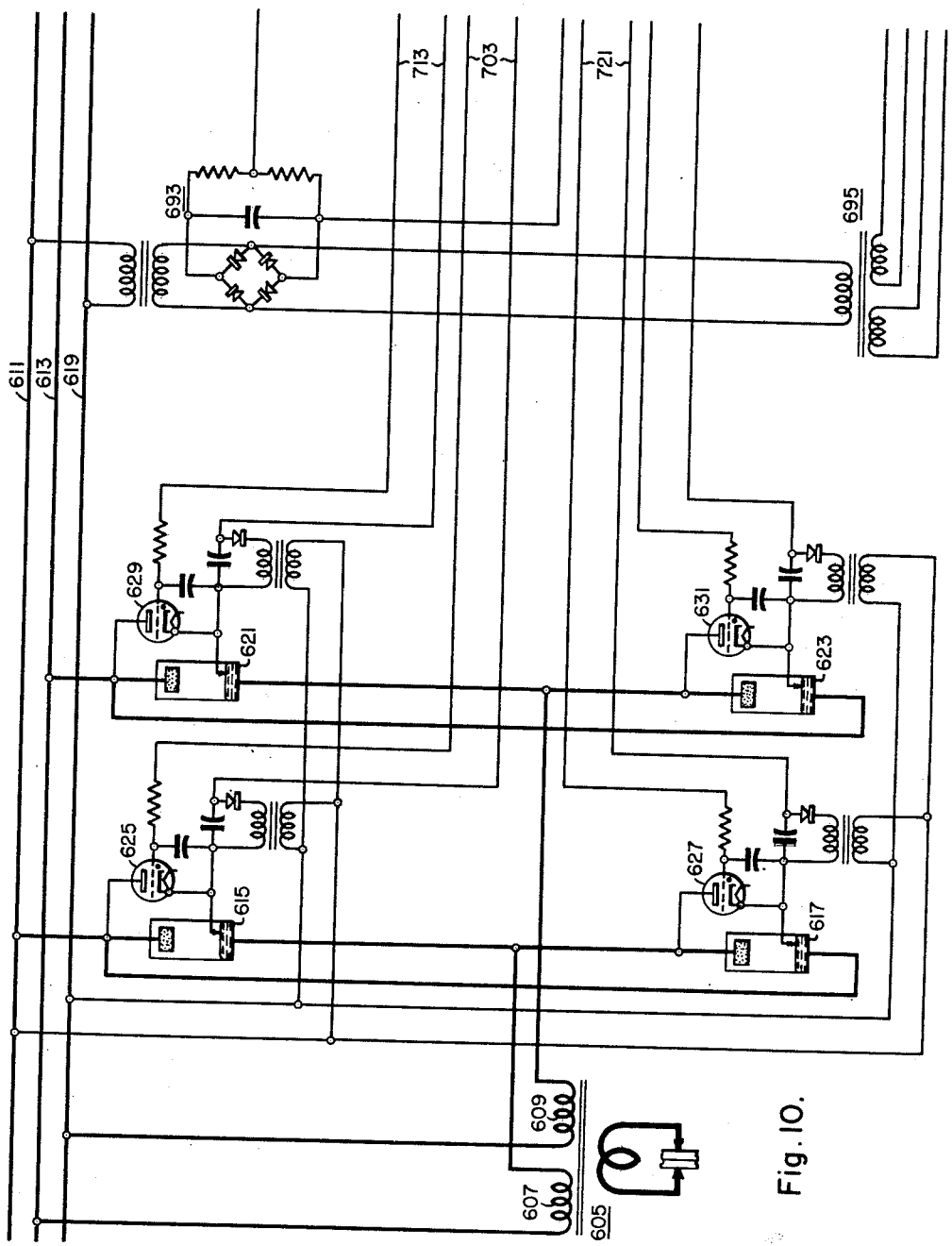

Figs. 5 and 5A together constitute a circuit diagram of a modification of my invention;

Fig. 6 is a graph illustrating the operation of the apparatus shown in Figs. 5 and 5A;

Fig. 7 is a graph similar to the graphs shown in Figs. 1 and 4, but corresponding to the apparatus shown in Figs. 5 and 5A;

Fig. 8 is a circuit diagram of a further embodiment of my invention;

Fig. 9 is a circuit diagram of still another modification of my invention;

Figs. 10 and 10A together constitute a circuit diagram of a still further modification; and Fig. 11 is a graph similar to the graph shown in Figs. 1, 4 and 7, but corresponding to the modifications shown in Figs. 10 and 10A.

For a proper understanding of my invention, it is desirable that the operation of the apparatus shown in any of the above-listed applications be understood. To facilitate the explanation of my invention, I shall, accordingly, briefly discuss the operation of the apparatus shown in Figs. 1, 2 and 3 of Patent 2,619,591.

The apparatus shown in Patent 2,619,591, includes a welding transformer having three primary windings 11, 12 and 13. The primaries are supplied from the buses L1, L2, L3 of a three-phase source through three pairs of ignitrons, 1TU, 2TU; 3TU, 4TU; and 5TU, 6TU each connected in anti-parallel. The buses L1, L2, L3 are customarily the buses of a commercial alternating current supply which in the United States has a frequency of 60 cycles and in other countries may have a different frequency, such as 50 cycles, for example. Power is supplied to the primaries 11, 12 and 13 in sequence, first in one direction during one low frequency half period through ignitrons 1TU, 3TU and 5TU constituting one group, and then during the succeeding low frequency half period in the opposite direction through ignitrons 2TU, 4TU and 6TU constituting another group. When ignitrons 1TU, 3TU and 5TU are conductive, current flows from right to left through each of the primaries 11, 12 and 13, and when ignitrons 2TU, 4TU and 6TU are conductive, current flows from left to right. Each of the ignitrons becomes conductive when the bus to which its anode is connected is positive relative to the other buses and the proper control potential to fire its firing thyratron is impressed. The instant when an ignitron becomes conductive is determined by the setting of the taps 44 on the rheostat 36. The ignitrons 1TU, 3TU and 5TU, or 2TU, 4TU and 6TU, respectively, conduct in their turn during a predetermined number of successive periods of the supply which is determined by the low frequency which is desired. For example, we may assume that each of the ignitrons conducts twice during each low frequency half period of the supply. Under such circumstances, the low frequency is of the order of 12 cycles per second.

The apparatus described, on the whole, operates satisfactorily; but at low power factors the last of each of the ignitrons to conduct, that is, the ignitrons 5TU and 6TU may continue to conduct indefinitely. This operation is illustrated in Fig. 1 of the present application. In this view, the current built up in the welding transformer T is plotted as a function of time. Current is plotted vertically and time horizontally. To facilitate understanding equally spaced abscissae, corresponding to instants when successive ignitrons become conductive, are labeled in terms of twelfths of periods of the supply. Each of the loops represents an interval during which one of the ignitrons of a group is conductive and is labeled accordingly.

During the first low frequency first half period, each of the ignitrons 1TU, 3TU and 5TU is conductive twice. During the first $\frac{1}{12}$ of a supply period, ignitron 1TU conducts current from right to left through winding 11. During this interval bus L1 is positive relative to the other buses. At the end of the interval bus L2 becomes positive with respect to L1, but ignition 1TU continues to conduct because of the back potential provided by the winding 11. Now while ignitron 1TU is still conductive, ignitron 3TU is rendered conductive and current flows from right to left through winding 12. This current flow induces a potential across winding 11 which is so poled as to cause its right-hand terminal to become substantially positive with respect to its left-hand terminal. Ignitron 1TU is therefore extinguished. In the same manner as represented by their corresponding loops, ignitrons 5TU, 1TU, 3TU and 5TU are each in its term rendered conductive extinguishing the previously conductive ignitron. When ignitron 5TU is conductive for the second time, the ignitron 1TU is not again rendered conductive. The current flow through ignitron 5TU and its associated winding 13 then decays as shown by the sixth loop 5TU of the left-hand half wave of the curve. At this time the potential of the anode of ignitron 5TU is equal to the potential of bus L3, and the potential of its cathode is equal to the potential of bus L1 less the counteracting potential produced by winding 13. As the current flow through the ignitron 5TU is decaying, the potential of bus L1 is becoming more positive than the potential of bus L3 and this inverse difference of potential tends to extinguish ignitron 5TU. The ignitron 5TU is thus maintained conductive by the back electromotive force produced by the decay of flux in the transformer T, which is manifested as a potential across primary 13 in such a sense that the left-hand terminal of this primary is positive and the right-hand terminal is negative. If the current flow through ignitron 5TU would be permitted to decay uninterruptedly, this potential across primary 13 eventually would become smaller than the negative potential between buses L1 and L3, and the ignitron 5TU would become non-conductive.

However, $\frac{1}{12}$ of a period after ignitron 5TU was rendered conductive, ignitron 2TU is rendered conductive as represented by the first loop 2TU of the right half wave. As represented by the overlapping portion of the curve, the ignitron 2TU sometimes becomes conductive before the conductivity of ignitron 5TU is interrupted. This condition occurs particularly when the power factor of the load is low—of the order of 20% when calculated on the basis of 60-cycle supply. Ignitron 2TU conducts current from left to right through the primary 11 and induces a potential in primary 13 which increases the positive potential of its left terminal relative to its right terminal. This potential adds to the potential arising from the decaying flux and tends to maintain ignitron 5TU conductive as represented by the rising tail R on the positive curve. Power derived from the supply through ignitron 2TU between positive bus L2 and negative bus L3 is returned to the supply through ignitron 5TU between negative bus L3 and positive bus L1. In effect the supply is thus short circuited. The potential induced from primary 11 increases as represented by the first negative loop until ignitron 4TU becomes conductive when current flows from left to right through primary 12 as represented by the second negative loop. Again, a potential tending to maintain ignitron 5TU conductive, is induced and the latter, if it is still conductive, continues to conduct. Eventually, ignitron 6TU is rendered conductive as represented by the third negative loop and ignitron 5TU, if it is still conductive, is extinguished. However, ignitron 5TU has conducted for an excessively long interval under short-circuit conditions and eventually becomes so hot as to conduct continuously as the above-described process is repeated during successive welds. The short-circuit operation also materially deteriorates the transformer T. The above-described operation also occurs when ignitron 6TU fails to become non-conductive before ignitron 1TU becomes conductive.

Figure 2:
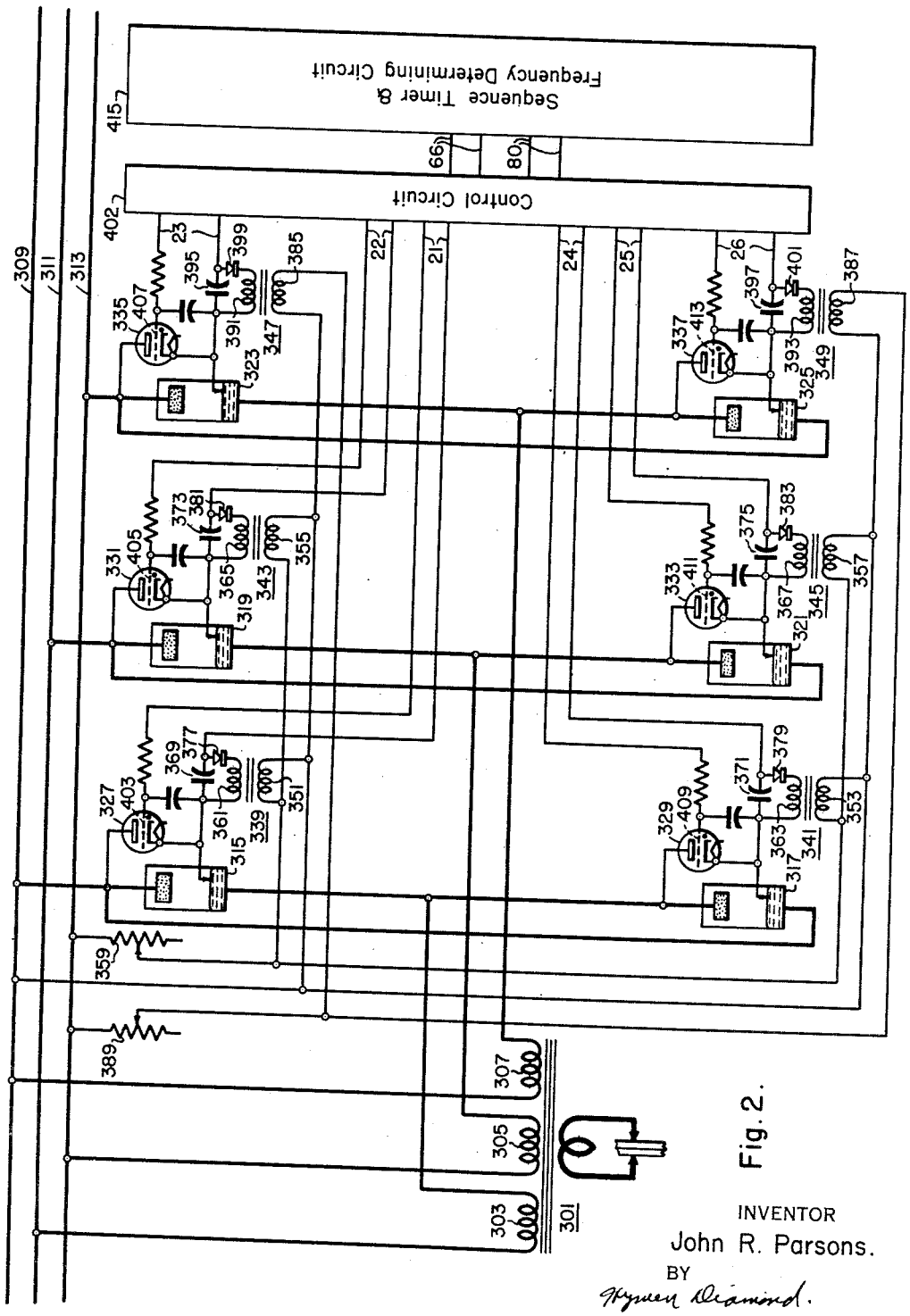
Fig. 2 is a circuit diagram of a preferred embodiment of my invention.

The apparatus shown in Fig. 2 includes a welding transformer 301 of the type disclosed in the Patent 2,619,591. This transformer has three primaries 303, 305 and 307. Each of the primaries is connected between a pair of buses 309, 311; 311, 313; and 313, 309, respectively, of a three-phase power supply through a pair of anti-parallel ignitrons 315, 317; 319, 321; and 323, 325, respectively. Thyratrons 327, 329, 331, 333, 335 and 337, respectively, are provided for firing each of the ignitrons. In the control circuit of each of the thyratrons, a bias is impressed from transformers 339, 341, 343, 345, 347 and 349, respectively. The primaries 351, 353, 355 and 357 of the transformers 339 to 345, respectively, associated with these four firing thyratrons 327 to 333, respectively, are connected across two of the buses 309 and 313 through a resistor 359. The secondaries 361, 363, 365 and 367 of each of the transformers 339 to 345, respectively, are each connected across capacitors 369, 371, 373 and 375, respectively, through rectifiers 377, 379, 381 and 383, respectively, preferably of the dry type. Capacitors 369 to 375, respectively, are connected in the control circuit of its thyratrons 327 to 333, respectively, in such a sense that the charge which is impressed on it from its transformers 339 to 345 tends to maintain the thyratron non-conductive. Other biasing potential from the primaries 385 and 387 of the other transformers 347 and 349 are connected across the buses 309 and 313 through a second resistor 389 which is of substantially smaller magnitude than the first-named resistor. The secondaries 391 and 393 of these latter transformers are connected to charge capacitors 395 and 397 in the same manner as the secondaries of the other transformers. The biasing transformers 339 to 345, the capacitors 369 to 373, the transformers 347 and 349, and the rectifiers 377, 379, 381, 383, 399 and 401 are for all thyratrons, substantially identical. Accordingly, the biasing potential impressed in thyratrons 335 and 337 is substantially greater than the corresponding bias for the other thyratrons 327 to 333.

The firing thyratrons are controlled from a Control Circuit 402 identical to that shown in Fig. 2 of application Serial No. 52,103. The conductor pairs labeled 21, 22, 23, 24, 25 and 26 each connected, respectively, to the control electrode 403, 405, 407, 409, 411, 413, respectively and to the biasing capacitor 369, 373, 395, 371, 375, and 397, respectively, of each of the thyratrons 327, 331, 335, 329, 333 and 337, respectively, are identical to the conductor pairs 21, 22, 23, 24, 25 and 26 shown in Fig. 2 of application Serial No. 52,103. The Control Circuit is controlled from a Sequence Timer and Frequency Determining Circuit 415, such as is shown in Fig. 3 of the application Serial No. 52,103. The conductor pairs labeled 66 and 80 in the Fig. 2 of the present application, are identical to the conductors labeled 66 and 80 in Fig. 3 of the above-mentioned application.

In the quiescent state of the apparatus, the firing thyratrons 327 to 337 are maintained nonconductive by the biases derived from the capacitors 369 to 375 and 395 and 397, and the ignitrons 315 to 325 are also non-conductive. In operation, pulses are impressed at the beginning of a number of successive periods of the supply first through conductors 66, and then, preferably during an equal number of periods, through conductors 80. The pulses impressed through conductors 66 causes pulses to be impressed in succession through conductors 21, 22 and 23. Each pulse from conductors 66 produces three pulses in succession, the first through conductors 21, the second through conductors 22 and the third through conductors 23. The latter pulses are impressed during the time when the bus 309, 311 or 313 connected to the anode of the ignitron 315, 319 or 323, respectively, associated with the conductors 21, 22, and 23, respectively, is positive relative to the other buses and preferably just as the respective buses become positive. These pulses have the wave form of half waves of the power supply and amplitudes sufficient to counteract the biases derived from the capacitors 369, 373 or 395, respectively. The higher bias impressed on the thyratron 335 is counteracted later in the corresponding half periods by the pulses derived from the conductors 23 than are the biases impressed on the other thyratrons 327 and 331 by the pulses impressed through the conductors 21 and 22, respectively. The pulses impressed through conductors 80 produce pulses in succession through conductors 24, 25 and 26; each pulse through conductor 80 producing three pulses, the first through conductor 24, the second through 25 and the third through 26. The latter pulses are preferably impressed just as the buses 311, 313 or 309 connected to the anodes of the associated ignitrons 317, 321 or 325 become positive.

This operation is illustrated in Fig. 3 in which potential is plotted vertically and time horizontally. The upper half sine wave represents a potential such as one derived from two of the buses 309, 311, 313 of the power supply and impressed as anode potential across one of the firing thyratrons. The shallow curve represents the critical firing curve corresponding to the anode potential represented by the upper curve. The intermediate line below the time axis represents the bias of lower absolute magnitude impressed through the resistor 359 in the control circuits of thyratrons 327 to 333 and the lowest line represents the bias of the higher magnitude impressed through the resistor 389 in the control circuit of the other thyratrons 335, 327. The counteracting potential derived from the conductors 21 and 22, and 24 and 25, is represented by the half wave on the intermediate line and the counteracting potential derived from the conductors 23 and 26 is represented by the half wave on the lowest line. The latter half wave intersects the critical curve substantially later in the anode half period than the former wave. Therefore, the firing thyratrons 327 to 333 which have the lower bias impressed in their control circuits and their associated ignitrons 315 to 321 are fired earlier than the other thyratrons 335 and 337 and their associated ignitrons 323 and 325.

As the pulses are impressed in the control circuits of the thyratrons 327, 331 and 335, first from conductors 21, then from conductors 22, then from conductors 23, each of the ignitrons 315, 319 and 323 is fired in its turn. First current is conducted through the first ignitron 315 and through its associated primary 303, next current is conducted through the second ignitron 319 and its associated primary 305, and finally, at a longer interval than the interval between the first two conducting operations, current is conducted through the third ignitron 323 and its associated primary 307. This process is repeated so long as pulses are supplied through conductors 66, each of the ignitrons 315, 319 and 323 conducting in its turn a number of times determined by the frequency of operation desired. Thereafter, pulses are impressed through conductors 80 and the other ignitrons 317, 321 and 325 conduct each in its turn. Current of a polarity opposite to the first polarity now flows through the primaries 303, 305 and 307. In this case also the delay between the conduction of the second and third ignitrons 321 and 325, respectively, exceeds the delay between the conduction of the first and second ignitrons 317 and 321, respectively.

Because of the delay between the conduction of the second and third ignitrons 319 or 321 and 323 or 325 in each case, the current flow through the load 301 which is conducted by the second ignitron 319 or 321 decays somewhat before the third ignitron 323 or 325 becomes conductive. The current through load 301, therefore, builds less abruptly than in the apparatus disclosed in Patent 2,619,591 and the conductivity of a last ignitron 323 or 325 which conducts current of one polarity is therefore interrupted before the first ignitron 317 or 315, respectively, to conduct current if the opposite polarity is rendered conducitve.

This operation is illustrated in Fig. 4 in which the current flow through the transformer 301 is plotted vertically and timed horizontally. For the purposes of plotting the graphs, I have assumed that during each low frequency period, each of the ignitrons 315 to 325 conducts twice. As indicated, each of the loops in the left-hand portion of this graph represents the current conducted by one of the ignitrons 315, 319 or 323 which conducts current of one polarity and the loops in the right portion represent the current conducted by the other ignitrons 317, 321 and 325. The second and the fifth loops 319 and 321 of each half period are longer than the others and drop off slightly because of the delay in each case in the firing of the ignitrons 323 and 325. The tail on the sixth loop 323 of the left portion reaches the time axis to the left of the beginning of the first loop 317 of the second portion; this representation corresponds to the termination in the conductivity of ignitron 323 before ignitron 317 is fired. The overlap of Fig. 1 does not occur.

The apparatus shown in Figs. 5 and 5A includes a transformer 301, ignitrons 315 to 325 and firing thyratrons 327 to 337 which are similar to those of the system shown in Fig. 2. The ignitrons are connected in the same manner as in the Fig. 2 system to the primaries 303, 305, 307 of the welding transformers 301. The biasing potential for the firing thyratrons 327 to 337 is, however, derived directly from the buses 309 and 313 of the power supply and not through resistors 359 and 389 as in the Fig. 2 modification and is the same for all of the thyratrons.

The thyratrons are controlled from a Control Circuit, on the whole, similar to the Control Circuit of the Patent 2,619,591. The former Control Circuit includes a plurality of rheostats 417, 419 and 421 which are supplied with potential from a delta transformer 423 connected to the main buses 309, 311 and 313. These rheostats are connected in delta across midtaps of the secondaries 425, 427, 429 of the delta transformer. The midtaps are connected through resistors 431, 433, 435 to a common conductor 437 which constitutes a neutral auxiliary bus. Potentials depending in phase position on the settings of the movable taps 439, 441, 443 of the rheostats 417, 419, 421, respectively, may be derived between each of the taps and the bus 437.

The bus 437 is connected to the common junctions of the cathodes 445, 447 and 449 of one group of three thyratrons 451, 453 and 455, respectively, and the anodes 457, 459 and 461 of a second group of three thyratrons 463, 465 and 467, respectively. The anode 469 of the first thyratron 451 of the former group is connected to one of the taps 443 through the primary 471 of a transformer 473; the anode 475 of the second thyratron 453 is connected to a second tap 441 through the primary 477 of a second transformer 479 and the anode 481 of the third thyratron 455 is connected to the third tap 439 through a network consisting of a capacitor 483 having a resistor 485 in parallel to it, and the primary 487 of the third transformer 489. The cathodes 491, 493, 495 of the thyratrons 463, 465, 467, respectively, of the other group are correspondingly connected through the primaries 497, 499, 501, respectively, of additional transformers 503, 505, 507, respectively, to the taps 443, 441 and 439, respectively. The cathode 495 of the third thyratron 467 of the last mentioned group is connected through a capacitor-resistor network 509, 511 similar to the network 483, 485 through which the third thyratron 455 of the first group is connected. In the control circuits of the thyratrons 451, 453, 455 of the first group, a common bias 513 is connected. In the control circuits of the thyratrons 463, 465, 467 of the second group, separate biases are impressed from a common transformer 515 having a single primary and three secondaries which supplied from two main buses 309 and 313. The biases 513 and 515 are of a magnitude and polarity such as to maintain the thyratrons non-conductive.

The biases 513 and 515 in the control circuits of the thyratrons may be counteracted by potential derived from the Sequence Timer and Frequency Determining Circuit 415 of the type shown in Fig. 3 of Patent 2,619,591, (Fig. 1C here) through line conductors 66 and 80, respectively. These conductors are identical to the conductors labeled 66 and 88 of the Fig. 3 circuit shown in application Patent 2,619,591. The counteracting potentials are impressed first through conductors 66 at the beginnings of a predetermined number of successive periods of the supply, and thereafter through the conductors 80 at the beginnings of a succeeding number of periods of the supply preferably equal to the first number.

The first pulse impressed through the conductors 66 charges a capacitor 517 in the control circuit of the first thyratron 451 through a rectifier 519 to a potential such that the bias in this control circuit is counteracted. At an instant predetermined by the setting of the associated rheostat 421, this thyratron is rendered conductive and current flows through the transformer 473 connected in its anode circuit. From one secondary 521 of this transformer, a pulse is impressed through a pair of conductors 523 in the control circuit of the firing thyratron 327 of one of the ignitrons 315. This ignitron is rendered conductive and current flows through the associated primary 30 of the welding transformer 301. From another secondary 525 of the transformer 473 connected to the first thyratron 451, a pulse is impressed through a rectifier 527 to charge a capacitor 529 in the control circuit of the second thyratron 453. At an instant predetermined by the setting of the associated rheostat 419, this second thyratron is now rendered conductive and current is transmitted through the associated transformer 479 in its anode circuit. From a secondary winding 531 of the transformer 479 through another pair of conductors 533, the firing thyratron 331 of a second ignitron 319 is rendered conductive. Current now flows through the second primary 305 of the welding transformer 301. From another secondary winding 535 of the transformer 479 supplied from the second thyratron 453, potential is impressed through a rectifier 537 to charge a capacitor 539 in the control circuit of a third thyratron 455. At an instant predetermined by the setting of the associated rheostat 417, this third thyratron is rendered conductive. Current now flows through the transformer 489 connected in the anode circuit of this thyratron and through the capacitor-resistor network 483, 485. From the secondary 541 of this transformer 489, through conductors 543, the firing thyratron 335 of a third ignitron 323 is rendered conductive. Current now flows through the third primary 307 of the welding transformer 301. The rheostats 421, 419 and 417 are so set that the current flow through each of the respective ignitrons 315, 319 and 323 is initiated preferably at the instant when the bus 309, 311 and 313 connected to its anode becomes positive relative to the other buses.

The third ignitron 323 is conducting at the end of the first period of the supply. At this time, the capacitor 483 in the anode circuit of the thyratron 455 through which the firing thyratron 335 of the third ignitron was fired is charged and is gradually discharging through the shunt resistor 485; the discharge is at a relative low rate.

Another pulse is now impressed from the conductors 66. The first and second thyratrons 451 and 453 and their associated ignitrons 315 and 319 are rendered conductive as during the first supply period; the former in accordance with the settings of the rheostats 421 and 419 and the latter at the instant when the buses 309 and 311 connected to the anodes of the ignitrons 315 and 319, respectively, become positive. The firing of the third thyratron 455 is, however, this time not alone controlled by the setting of the associated rheostat 417. In addition to the potential impressed from the rheostat, the third thyratron now has a potential impressed in its anode circuit which is dependent on the residual charge remaining on the capacitor 483. This charge has such a polarity as to increase the negative potential of the anode 481 relative to the cathode 449 and thus tends to counteract the positive potential impressed from the rheostat 417. The third thyratron is, therefore, rendered conductive at a greater interval following the instant when the second thyratron is rendered conductive than it was during the first sequence of operations of the three control thyratrons 451, 453, 455. During this additional time, the current flow through the second primary 305 of the welding transformer 301 decays somewhat. At the end of this interval thereof, the anode cathode potential of the third thyratron 455 becomes positive and the third thyratron is rendered conductive firing the third firing thyratron 335 and the associated ignitron 325, and the current flows through the associated primary 307 of the welding transformer.

The operation of the third thyratron circuit is illustrated in Fig. 6. In this view, potential is plotted vertically and time horizontally. As labeled the overlapping half sine waves represent the potentials impressed from the rheostats 421, 419, 417. The shaded areas under the third and sixth sine waves represent the time intervals during which the third thyratron 455 is conductive. The sawtooth shaped curve represents the control potential impressed from the transformer 479 and which counteracts the bias in the control circuit of the third thyratron 455. The sloping line extending from the peak of the third half sine wave represents the decay of the potential on the capacitor 483 in the anode circuit of the third thyratron. The third half sine wave is shaded throughout to indicate that the thyratron 455 is rendered conductive early during this corresponding half period. During the succeeding interval when firing potential is impressed on the third thyratron, the anode potential of the third thyratron is negative until the instant represented by the point at which the upper sloping line crosses the sixth half sine wave. This instant is substantially later in the corresponding half period than is the corresponding instant when the third thyratron is rendered conductive for the first time.

Since the current flow through the second primary 305 was permitted to decay somewhat during the short interval during which the conductivity of the third control thyratron 455 was delayed, the current flow through the third primary 307 does not build up the current in the transfomer 301 as abruptly as it would if the third thyratron 455 were fired early. The above-described operation would be repeated if additional pulses were supplied through the conductors 66. For the purpose of simplifying the explanation, I shall assume that pulses are supplied only during two periods of the supply through the conductors 66.

Pulses are now supplied at the beginnings of two succeeding periods through the conductors 80. The first of these pulses causes the first thyratron 463 of the second group to become conductive. The current flow through this thyratron induces a potential in the control circuit of the firing thyratron 329 of a first ignitron 317 of the second group, and current now flows from left to right through the first primary 303. The timing of the pulse derived from the conductors 80 is such that the first thyratron of the second group is fired approximately 5/12 of a supply period after the lower bus 313 connected to the anode of the third thyratron 323 of the first group becomes positive with respect to the other buses 309 and 311. Because of the delay in the firing of the third ignitron 323, this ignitron is, at this time, non-conductive. The first ignitron 317 of the second group accordingly alone conducts current through the first primary 303.

As the second and third thyratrons 465 and 467 of the second group are each, in its turn, rendered conductive, the second and third ignitrons 321 and 325 of the second group are fired and current is conducted from left to right through the associated primaries 305 and 307 of the welding transformer. As was the case when the third thyratron 455 of the first group was rendered conductive, a capacitor 509 in the anode circuit of the third thyratron 467 of the second group is now charged. The charge on the capacitor is slowly dissipated through the shunt resistor 511.

Another pulse is now impressed through the conductors 80 and the first, second and third thyratrons 463 and 465 of the Control Circuit are again rendered conductive and, in turn, cause the associated ignitrons 317 and 321 to become conductive as before. This time, the capacitor (509) potential counteracts the rheostat (417) potential and the third thyratron 467 is rendered conductive correspondingly later than it was the first time. The associated ignitron 325 is rendered conductive correspondingly later and the current flow through the transformer 301 decays somewhat before it is further built up by conduction through the third primary 307.

A pulse is now impressed through the conductors 66 at the beginning of a succeeding period of the supply. Now the first ignitron 315 of the first group is rendered conductive after the third ignitron 325 of the second group becomes non-conductive because of the delay in firing. The above-described process is repeated a number of times dependent on the desired low frequency.

Because the third ignitron of each group is extinguished before the first ignitron of the other group fires, the excessive conductivity of the third ignitron of each group is thus avoided. These ignitrons now do not become so hot as to conduct continuously and the transformer is not damaged.

The operation just described is illustrated graphically in Fig. 7. In this graph, current is plotted vertically and timed horizontally. As labeled each of the loops above the time axis represents the current conducted in succession by the three ignitrons 315, 319 and 323 of the first group. The loops below the time axis correspondingly represent the current conducted by the ignitrons 317, 321 and 325 of the second group. In each case the fifth loop 319 and 321 is longer than the others and drops to correspond to the delay in firing of the third thyratron 455 and 457 when they are fired for the second time. The sixth loop 323 of the first group intersects the time axis just to the left of the first loop 317 of the second group.

In the apparatus shown in Fig. 8, power derived from a single-phase source of commercial frequency is supplied to a load of substantially smaller frequency. This system includes a welding transformer 551 having a primary 553 provided with an intermediate tap. This tap is connected to one bus 555 of the supply. The terminals of the primary 553 are each connected to another bus 557 of the supply through a pair of ignitrons 559 and 561, and 563 and 565 in anti-parallel. Each ignitron is fired from a thyratron 567, 569, 571 and 573, respectively.

When the apparatus is in the quiescent state, the thyratrons 567 to 573 are maintained non-conductive by bias 575, 577, 579, 581 impressed in the control circuit of each respectively. The bias 575 and 581 impressed in the control circuit of one of the thyratrons 567 and 573, respectively, of each pair is substantially lower than the bias 577 and 579 impressed in the control circuit of the other thyratrons 569 and 571, respectively.

The thyratrons are controlled from a Control Circuit and Frequency Determining Circuit and Sequence Timer 583 of the type shown in application Patent 3,510,652. The transformers of the system shown in Fig. 8 which are identified by the numerals 171, 193, 239 and 249 are identical to the same numbered transformers of the system shown in Figs. 1 and 2 of Patent 2,619,591 (Figs. 1A and 1B).

The operation of the Control Circuit, Frequency Determining Circuit and Sequence Timer 583 is identical to that of the same circuit shown in Patent 2,510,652. Pulses are supplied during a predetermined number of successive half periods of the supply alternately through transformer 171 and transformer 193. These pulses are impressed in the control circuits of the thyratrons 559 and 563 displaced in phase with reference to the potential supplied from the buses 555 and 557. This phase displacement is illustrated as of the order of 90° in Patent 2,510,652 and may be the same in this case. The phasing is such that when any pulse is impressed the bus to which the anode of the associated ignitron is connected is positive relative to the other bus. During a succeeding number of half periods of the supply, similar pulses are supplied alternately through transformers 239 and 249. The pulses supplied through transformers 171, 193, 239 and 249 may be of approximately sine wave form. The amplitude of each of the pulses is sufficient to counteract the bias 575 to 581. However, the low biases 575 and 581 are counteracted earlier in the half periods of the supply than the high biases 577 and 579.

When a pulse is impressed through the transformer 171, the associated firing thyratron 567 is rendered conductive early in the half period of the supply 555, 557. The corresponding ignitron 559 is then fired and current is conducted from the upper bus 557 through the ignitron, the left-hand portion of the primary 553 to the other bus 555. During the succeeding half period of the supply, a pulse is supplied through the transformer 193. The associated thyratron 571 and its ignitron 563 are now fired substantially later in the half period of the supply, current is conducted from the lower bus 555 through the right-hand portion of the primary 553, the ignitron to the upper bus 557. Because the firing of the second ignitron is delayed, the current in the transformer 551 built up through the first ignitron is permitted to decay somewhat in the same manner as the current of the second ignitrons 321 and 325 of the systems shown in Figs. 2, 5 and 5A. Another pulse is now supplied through the transformer 171 and the first ignitron 559 is again rendered conductive early in its half period of the supply. Current again flows through the left-hand portion of the primary 553. Thereafter, a pulse is supplied through the transformer 193 and the second ignitron 563 is again rendered conductive later in its positive half period of the supply. A second current pulse now flows through this ignitron 563 and through the right-hand portion of the primary 553. The alternate supply of pulses through the transformers 171 and 239 may continue in this manner until a low frequency half wave of the desired duration is supplied through the transformers 551. For the purpose of the present explanation, we may assume that each half period of the low frequency is made up of four half periods of the supply frequency 555, 557 accordingly that only two pulses are supplied through each of the transformers 171 and 193.

Pulses are now supplied through the transformers 239 and 249 in the control circuits of the associated firing thyratrons. The first pulse supplied through the transformer 239 renders the associated firing thyratron 573 conductive early in its positive half period of the supply and current flows through the ignitron 565. The ignitron 565 is fired at an instant in the half period of the high frequency supply determined by the phase of the pulse supplied from the transformer 239. This instant may be approximately ¼ of the supply period after the zero instant as illustrated in Fig. 3 of application Serial No. 52,104. At this time the second ignitron 563 of the first group has been conductive for approximately one supply period and the current flow through it has been interrupted. Current now flows from the upper bus 557 through the conductive ignitron 565, the right-hand portion of the primary 553 to the lower bus 555. During the next half period of the supply, potential is impressed through the transformer 249 in the control circuit of the other firing thyratron 569. Because of the high bias 577, this thyratron is now rendered conductive later in its positive half period than the first thyratron firing the other ignitron 561. Current now flows from the bus 555 through the left-hand portion of the primary 553, the ignitron to the upper bus 557. Because of the delay in firing of the second ignitron, the current flow through the welding transformer 551 decays somewhat before it is further built up by the current flow through the second ignitron. Another pulse is now supplied through the transformer 239 and the first ignitron 565 is rendered conductive earlier in its half period than the second ignitron conducting current through the right-hand portion of the primary 553. A fourth pulse is now supplied through the transformer 249 and current is again conducted through the left-hand portion of the primary 553 and the second ignitron 561. Thereafter, in dependence upon the setting of the sequence timer, the above-described process may be repeated.

During the above-described process, current is supplied first from left to right through the portions of the primary 553 for four half periods of the supply and then from right to left through the primary during four succeeding half periods. In each case, the current flow through the last conductive ignitron 563 or 561 is interrupted before the current flow through the first tube of the second group is initiated. This interruption is effected by the delay in firing the second ignitron in each case.

The apparatus shown in Fig. 9 is similar to the apparatus shown in Fig. 8. However, in the system shown in Fig. 9 the biases 585, 587, 589 and 591 in the control circuits of the thyratrons 567 to 573 are alike. The latter thyratrons are controlled from a Control Circuit, Frequency Determining Circuit and Sequence Timer 593 similar to that shown in Patent 2,510,652 except for the anode circuits of the thyratrons 123 and 125 which are identical to the like numbered thyratrons of the system shown in Patent 2,510,652. In the anode circuits of the thyratrons 123 and 125 (identical to the thyratrons 23 and 25 of Patent 2,510,652) of the system shown in Fig. 9, networks are connected, each consisting of a capacitor 595 and 597 shunted by a resistor 599 and 601, respectively. These networks are similar to the networks 483, 485; and 509, 511 included in the apparatus shown in Fig. 5A of the present application. As in the system shown in Fig. 5A, these networks 595, 599; 597, 601 are in series with the primaries 191 and 603 of the transformers 193 and 249, respectively.

In the same manner as in the Fig. 8 system, a pulse is supplied first through the transformer 171 to render the first ignitron 559 conductive early in its positive half period. Current is conducted through the left-hand portion of the primary 553. The thyratron 123 connected to the primary 191 of the transformer 193 is now rendered conductive, a pulse is supplied through this transformer 193, the second ignitron 563 is fired early in its half period and current flows through the right-hand portion of the primary. At the same time, the capacitor 595 in the anode circuit of the thyratron 123 is charged. This capacitor discharges slowly through its shunting resistor 599. A second pulse is now impressed through the transformer 171 and the first ignitron 559 is again fired conducting current through the left-hand portion of the primary. Potential is now again impressed to fire the thyratron 123 from the secondary winding 181 of the transformer 171, but because of the counter-potential on the capacitor 595, this thyratron is fired substantially later in its positive half period than the first time. The associated ignitron 563 is fired correspondingly later and the current flow through the primary decays somewhat before it is further built up by the flow through the latter ignitron.

Potential is now impressed through the transformer 239 to fire the first ignitron 565 of the second group. Because of the delay in the firing of the second ignitron 563 of the first group, the current flow through the latter is interrupted before the first ignitron 565 of the second group fires. The second ignitron 561 of the second group is now fired during the subsequent half period of the supply as early in its positive half period as the first ignitron 565. The charge on the capacitor 597 in the anode circuit of the second thyratron 25 is now built up. The first ignitron 565 of the second group is now fired for the second time and, thereafter, the second ignitron 561 is fired. But because of the charge on the capacitor 597, the latter ignitron 561 is fired substantially later in its half period than it was the first time so that the current in the transformer 551 now decays somewhat before it is further built up by the current flow through the ignitron. The above-described process may be repeated in accordance with the requirements of the material to be welded and the setting of the sequence timing. During each repetition, the second ignitron 571 or 561 of the last conducting group becomes non-conductive before the first ignitron of the newly conducting group fires.

In the apparatus shown in Figs. 10 and 10A, power derived from a polyphase commercial source is supplied to a welding transformer 605 at a substantially lower frequency than that of the source. The transformer 605 includes a pair of primary windings 607 and 609; the first 607 connected between the upper bus 611 of the supply and the center bus 613 through a pair of ignitrons 615 and 617 in anti-parallel; the second 609 connected between the center bus 613 and the lower bus 619 through a second pair of ignitrons 621 and 623 in anti-parallel. With each of these ignitrons 615, 617, 621, 623 a firing thyratron 625, 627, 629 and 631, respectively, is associated. The firing thyratrons 625 to 631 are biased to non-conductivity and in the quiescent state of the apparatus, the ignitrons 615, 617, 621, 623 are non-conductive.

The firing thyratrons are controlled from a Control Circuit including four thyratrons 633, 635, 637, 639, each associated with one of the firing thyratrons 625 to 631, respectively. The Control Circuit is supplied from the secondary winding 643 of the delta transformer 641 energized from the main buses 611, 613, 619. The center taps of the windings of this secondary are connected together, each through a resistor 645, 647, 649, respectively. The common junction of the resistors constitutes a neutral bus 651 for the Control Circuit. The center tap of one winding of the secondary 643 is connected to the common junction of a pair of rheostats 653 and 655. The remaining terminals of the rheostats are connected to the other center taps. The anode 657 of the control thyratron 633 associated with one ignitron 615 is connected to the adjustable tap 659 of one rheostat 653 through the primary 661 of a transformer 663. The cathode 665 of a control thyratron 635 associated with the anti-parallel connected ignitron 617 is connected to the same tap 659 through the primary 667 of another transformer 669. The cathode 671 of the former thyratron 633 and the anode 673 of the latter 635 are connected to the neutral bus 651. The anode 675 and cathode 677 of thyratrons 637 and 639, respectively, associated with the other ignitrons 621 and 623 are connected to the adjustable tap 679 of the other rheostat through the primaries 681 and 683, respectively, of another pair of transformers 685 and 687, respectively. The cathode 689 and anode 691 of these thyratrons 637 and 639, respectively, are connected to the neutral bus 651. A common bias 693 is connected in the control circuits of the two control thyratrons 633 and 637. The other two control thyratrons 635 and 639 are provided in their control circuit with separate biasing potentials from a transformer 695 having a single primary and a pair of secondaries. The bias impressed in the control circuit of each of the control thyratrons 633 and 639 is sufficient to maintain the control thyratrons non-conductive in the quiescent state of the apparatus.

The conductivity of the control thyratrons is controlled from a Sequence Timer and Frequency Determining Circuit 696 of the type shown in Fig. 3 of application Patent 2,619,591. The pairs of conductors identified by the numbers 66 and 80 in Fig. 10A of the present application are identical to the conductors identified by the numerals 66 and 80 in Fig. 3 of the application Patent 2,619,591.

In the operation of the apparatus, pulses are supplied first through the pair of conductors 66 at the beginnings of a predetermined number of successive periods of supply and then through the conductors 80 at the beginnings of a succeeding number of successive periods of the supply. A pulse derived from the conductor 66 is impressed through a rectifier 697 across a capacitor 699 connected between the control electrode 701 of the first control thyratron 633 and the bias 693. This capacitor 699 is charged in such a sense as to counteract the bias 701. At an instant predetermined by the setting of the associated rheostat 655, the thyratron 633 is rendered conductive and current flows through the primary 661 of the associated transformer 663. Firing potential is now impressed through conductors 703 from a secondary winding 705 of this transformer in the control circuit of the firing thyratron 625 for the first ignitron 615. The rheostat 655 is so set that this potential is impressed at the instant when the bus 611 connected to the anode of the ignitron 615 becomes positive relative to the other buses. This ignitron, therefore, conducts current through its associated primary 607 of the welding transformer 605.

From a second winding 707 of the control transformer 663, potential is impressed across a capacitor 709 connected in the control circuit of the second thyratron 637 in the same manner as the capacitor 699 is connected in the control circuit of the first thyratron 633. At an instant predetermined by the setting of the associated rheostat 653, the second thyratron 637 is now rendered conductive conducting current through its associated control transformer 685. From the secondary 711 of this transformer 685 through conductors 713, the associated firing thyratron 629 is rendered conductive. This thyratron is rendered conductive at the instant when the bus 613 connected to the anode of its ignitron 621 becomes positive relative to the other buses. Current is now conducted through the second winding 609 of the welding transformer. This current continues to flow for a substantially longer time interval than the current through the first primary 607 and the current built up in the welding transformer 605 by the conduction of the two ignitrons 615 and 621 decays somewhat. At the beginning of the succeeding period of the supply, a second pulse is supplied through the conductors 66. The first thyratron 633 is again rendered conductive firing the first ignitron 615. Again current is transmitted through the first primary 607. When the bus 613 connected to the anode of the second ignitron 621 again becomes more positive than the other buses, the second ignitron 621 is again rendered conductive and current flows through its associated winding 609.

If the sequence timer (696) is properly set, another pulse may be transmitted through the conductors 66 at the beginning of a further period of the supply. However, for the purpose of the present explanation, we may assume that only two pulses are transmitted through conductors 66 and, thereafter, two pulses are transmitted through the conductors 80 at the beginning of subsequent period of the supply. The first pulse is transmitted through conductors 80 a short time before the instant when the bus 613 to which the anode of the first thyratron 617 of the second group is connected becomes positive relative to the other buses 611 and 619. The latter instant is approximately one period of the supply after the second ignitron 621 of the first group was rendered conductive. During this time, the current flow through the welding transformer 605 decayed, and the latter ignitron 621 became non-conductive.

The pulse transmitted through the conductors 80 is impressed on a capacitor 715 connected between the control electrode 717 and the cathode 665 of the first thyratron 635 of the second group through the bias 693 charging the latter to a potential such that the bias is counteracted. This thyratron 635 is now rendered conductive transmitting current through the primary 667 of its associated control transformer 669. From one secondary winding 719 of this transformer through conductors 721, the firing thyratron 627 associated with the ignitron 617 of the second group is rendered conductive. This ignitron now conducts and current of a polarity opposite to the polarity of the current which has been flowing is transmitted through the first primary 607. Through a second winding 723 of the control transformer 669, a potential is impressed to counteract the bias in the control circuit of the second control thyratron 639 of the second group. At an instant predetermined by the setting of its associated rheostat 653, this thyratron now becomes conductive rendering the associated firing thyratron 631 and its ignitron 623 conductive. Current now flows through the second primary 609. The current flow through this primary continues until the beginning of the succeeding period of the supply when a second pulse is transmitted through the conductors 80. The second period of the supply begins approximately $\tfrac{3}{2}$ of the period of the supply after the second ignitron 623 was rendered conductive. The current flow through the transformer 605 therefore decays somewhat before the second pulse is impressed through the conductors 80. The second pulse again charges the capacitor 715 in the control circuit of the first thyratron 635 rendering the latter conductive at the instant predetermined by the setting of its associated rheostat 655. The associated ignitron 615 is now again rendered conductive further building up the current in the transformer 605. At an instant predetermined by the setting of the other rheostat 653, the second control thyratron 639 is rendered conductive and its associated ignitron 623 further conducts current through the second primary of the transformer. Now, the above-described process may again be repeated and current supplied to the welding transformer during another low frequency cycle. If it is repeated, the ignitron 623 will have become non-conductive before ignitron 615 fires.

The operation of the system shown in Figs. 10 and 10A is graphically illustrated in Fig. 11. In this view, current is plotted vertically and timed horizontally. As labeled the loops above the time axis correspond to the current conducted by the ignitrons 615 and 621; that is windings 607 and 609 from right to left; and the loops below the axis correspond to the current conducted by the ignitrons 617 and 623 through the windings 607 and 609 from left to right. Current begins to flow through the primary 607 approximately $\frac{1}{12}$ of a period of the supply after the beginning of the period during which the first pulse is impressed through the conductors 66. This current as indicated by the first loop flows between the instants $\frac{1}{12}$ and $\frac{5}{12}$ after the beginning of period. At the instant $\frac{5}{12}$ after the beginning of the period, the second ignitron 621 is rendered conductive and current flows through the winding 609 as represented by the second loop. This current flows until $\frac{13}{12}$ of a period after the beginning of the first period. At this point, current is again conducted through the first primary 607 for approximately $\frac{4}{12}$ of a period as represented by the third loop 615 and then current flows through the second primary 609 as represented by the fourth loop 621. The current conducted by the second ignitron now continues until just before the first ignitron 617 of the second group is rendered conductive. This current continues for somewhat less than one period of the supply as represented by the fourth loop 621. Thereafter, the current flow through the other ignitrons as represented by the corresponding loops 617, 623 below the time axis.

Although I have shown and described certain specific embodiments of my invention, I am fully aware that many modifications thereof are possible. My invention, therefore, is not to be restricted excepted insofar as is necessitated by the prior art and by the spirit of the appended claims.

I claim as my invention:

1. Apparatus for converting power of one frequency to be derived from a pulsating supply to a substantially lower frequency to be supplied to an inductive reactive load, including a plurality of electric discharge paths, each consisting of an anode and a cathode; means for connecting each said anode and cathode between said supply and said load; a firing circuit for each said path; means connecting each firing circuit to its associated path; and means connected to said firing circuits causing said firing circuits to fire said paths periodically in a predetermined succession during successive pulsations of said supply; said apparatus being characterized by the novelty of a firing circuit for at least the last of said paths to fire in said succession including means for firing said path later, during at least one of the pulsations during which it is fired, than the other paths are fired during the pulsations during which they are fired.

2. In combination a plurality of conductors; a highly inductive reactive transformer having a plurality of primaries each primary corresponding to one of said conductors; a pair of electric discharge paths, each consisting of an anode and a cathode and having a control electrode interposed in anti-parallel between each conductor and its associated primary; first means connected to said control electrodes of said paths and including biasing means for supplying a bias potential to bias each of said paths to non-conductivity; and second means connected to said paths and including means for supplying potential pulses to counteract said biasing potentials of each of paths in succession; said first means being adapted to supply substantially equal biasing potentials to all said paths, and said second means being adapted to supply said counteracting pulses in trains, said second means including a network operative to delay certain of said pulses so that the time interval between the $(n-1)$th pulse and the $n$th pulse of any train is substantially shorter than the time interval between the $(an-1)$th and the $an$th pulse of any train where $n$ is the number of said primaries and $a$ is an integer greater than 1.

3. Apparatus for controlling the supply of current from an $n$ phase supply to a highly inductive reactive transformer having $n$ primaries, comprising in combination, means including at least one electric discharge path, consisting of an anode and a cathode and having a control electrode, for connecting each primary to a corresponding phase; and means connected to the control electrode of each of said paths for rendering said paths each in its turn conductive periodically during successive pulsations of said supply, the means connected to the control electrode of the one of said paths which is rendered conductive the last during each period of conductivity of said paths including a network and means for actuating said network to operate selectively for delaying the effectiveness of said means connected to control electrode of said one path thereby rendering said one path conductive at later instants in the pulsations impressed on said one path, during at least one pulsation of said supply during which it is conductive, than the other paths.

4. Apparatus for controlling the supply of current from an $n$ phase supply to a highly inductive reactive transformer having $n$ primaries, comprising in combination: means including at least one electric discharge path, consisting of an anode and a cathode and having a control electrode, for connecting each primary to a corresponding phase; and means connected to the control electrode of each path for rendering said paths each in its turn conductive periodically during successive pulsations of said supply, each path being rendered conductive at a predetermined instant in corresponding pulsation of said supply which instant occurs at a predetermined duration after a reference instant in said pulsation, said predetermined instant occurring at the same duration after said reference instant for all of said paths except the last one of said paths to conduct during each period of conductivity of said paths, the means connected to the control electrode of the said one of said paths including a delaying network and means for actuating said network to operate selectively for rendering said one path conductive at substantially the same duration after the reference instant of its corresponding pulsation as the other paths during the first pulsation of said supply during which it is conductive but at substantially a longer duration after the reference instant of its corresponding pulsation than the other paths during those pulsations during which it is conductive which follow the first.

5. In combination a plurality of conductors adapted to be connected to an alternation current supply; a highly inductive reactive transformer having a plurality of primaries each primary corresponding to one of said conductors; a pair of electric discharge paths each consisting of an anode and a cathode and having a control electrode interposed in anti-parallel between each conductor and its associated primary; first means connected to the control electrodes of said paths and including biasing means for supplying a bias potential to bias each of said paths to non-conductivity; and second means connected to the control electrodes of said paths and including means for supplying a potential to said paths in a predetermined succession during successive pulsations of said supply to counteract said bias potential so as to render said paths conductive in said succession; said first means being adapted to supply substantially equal biasing potentials to all said paths, and said second means including a network and means for selectively coupling said network to the one of said paths of said pairs which conducts last in said succession so that a counteracting potential is supplied to said one of the paths of said pairs which at corresponding instants in positive anode-cathode half periods of the supply for said one path are substantially lower than the counteracting potential supplied to the other of the paths of each of said pair at the same corresponding instants during their respective positive half periods of anode-cathode potential.

6. Apparatus for controlling the supply of current from an $n$ phase supply to a highly inductive reactive transformer having $n$ primaries, comprising in combination; a main electric discharge path, consisting of an anode and a cathode and having a control electrode, associated with each primary; means for connecting each said anode and cathode in circuit with a different phase of said supply and its associated primary; an auxiliary electric discharge path consisting of an anode and a cathode associated with each said main path; means coupling the anode and cathode each said auxiliary path to the control electrode of its associated main path; said coupling means including means for impressing a potential from a different phase of said source between said anode and cathode of each said auxiliary paths and said coupling for at least one of said auxiliary paths including a capacitor-resistor parallel network in series with its corresponding impressing means and its anode and cathode; and means rendering said auxiliary paths conductive repeatedly in a predetermined succession at predetermined instants in the potentials of their corresponding phases of said source to render the main paths associated with said auxiliary paths conductive in said predetermined succession, said one auxiliary path which being the path associated with the main path is last in said succession to be rendered conductive.

7. Apparatus for controlling the supply of current from an $n$ phase supply to a highly inductive reactive load, comprising in combination; a main electric discharge path, consisting of an anode and a cathode and having a control electrode, associated with each phase; means for connecting each said anode and cathode in circuit with its associated phase and said load; an auxiliary electric discharge path consisting of an anode and a cathode associated with each said main path; means coupling each said auxiliary path to the control electrode of its associated main path; said coupling means including means for impressing a potential from a different phase of said source between said anode and cathode of each said auxiliary path and said coupling means for at least one of said auxiliary paths including a capacitor-resistor parallel network in series with its corresponding impressing means and its anode and cathode; and means for rendering said auxiliary paths conductive repeatedly in a predetermined succession at predetermined instants in the potentials of their corresponding phases of said source to render the main paths associated with said auxiliary paths conductive in the same succession, said one auxiliary path being the auxiliary path associated with the main path which is rendered conductive last in said succession whereby said last path is rendered conductive later than said other paths in its pulsation of the supply during each of said of last-named pulsations.

8. In combination a first plurality of terminals; a second plurality of terminals, each of said last-named terminals corresponding to a terminal of said first plurality; a pair of electric discharge paths each consisting of an anode and a cathode associated with each of said terminals of said first plurality and a corresponding terminal of said second plurality; means for connecting said anodes and cathodes of each pair in anti-parallel between the associated terminals of said first plurality and its corresponding terminals of said second plurality; and a firing circuit connected to each of the control electrodes of said paths for firing said paths in a predetermined succession, each firing circuit including means for supplying a blocking potential to the control electrode to which it is connected to block firing of its corresponding path, said potential being of greater magnitude for the firing circuits of at least the last pair of said paths to fire in said succession than for the others.

9. In combination a first plurality of terminals; a second plurality of terminals, each of said last-named terminals corresponding to a terminal of said first plurality; a pair of electric discharge paths, each consisting of an anode and a cathode and having a control electrode, associated with each of said terminals of said first plurality and the corresponding terminal of said second plurality; means for connecting said anodes and cathodes of each said pair in anti-parallel between the associated terminal of its first plurality and its corresponding terminal of said second plurality; and a firing circuit connected to the control electrode of each of said paths to fire said paths in a predetermined succession, each firing circuit including an auxiliary electric discharge path consisting of an anode and a cathode and having a control electrode and means for connecting said last-named anode and cathode of each auxiliary path to conduct firing current to the control electrode of its corresponding main path; means connected to the control electrode of each auxiliary path for supplying a bias potential to bias said auxiliary path to non-conductivity, and means connected to the control electrode of each auxiliary path to supply a potential to counteract said bias potential; the counteracting potentials to all said auxiliary paths being substantially equal and the bias potential of the auxiliary paths associated with the main paths of at least the one of said pairs of paths which fire last in said succession being greater than the bias potential for the other auxiliary paths.

10. In combination a first plurality of terminals; a second plurality of terminals, each of said last-named terminals corresponding to a terminal of said first plurality; a pair of electric discharge paths each consisting of an anode and a cathode and having a control electrode associated with each of said terminals of said first plurality and a corresponding terminal of said second plurality; means connecting the anodes and cathodes of each said pair in anti-parallel between the associated terminal of said first plurality and its corresponding terminal of said second plurality; and a firing circuit connected to the control electrode each said paths for firing said paths in a predetermined succession, each firing circuit including an auxiliary electric discharge path consisting of an anode and a cathode and having a control electrode and means for connecting said last-named anode and cathode to conduct firing current to its corresponding main path; means connected to the control electrode of each auxiliary path for supplying a biasing potential to bias said auxiliary path to non-conductivity, said last-named connected means including a first voltage absorbing impedance common to the control electrodes of the auxiliary paths associated with the one of said pairs of main paths to fire last in said succession and a second voltage absorbing impedance of substantially greater magnitude than said first impedance common to the control electrodes of the auxiliary paths associated with the others of said main paths.

11. In combination a plurality of conductors; a highly inductive reactive transformer having a plurality of primaries each primary corresponding to one of said conductors; a pair of electric discharge paths each consisting of an anode and a cathode and having a control electrode associated with each conductor; means for connecting the anodes and cathodes of each said pair in anti-parallel between the associated conductor and its associated primary; first means connected to the control electrode of each path for supplying a bias potential to bias each of said paths to non-conductivity; and second means connected to the control electrode of each path for supplying a potential to counteract said bias potential to fire said paths in a predetermined succession; said first means being adapted to supply a higher bias potential to the paths of at least the last one of said pairs to fire in said succession than to the other paths and said second means being adapted to supply substantially equal counteracting potentials to all of said paths.

12. In combination a highly inductive reactive transformer having a primary having in electrical effect a midtap and a pair of endtaps; a first conductor; a second conductor, a pair of electric discharge paths each consisting of an anode and a cathode and having a control electrode associated with each said end traps; means for connecting said anodes and cathodes in anti-parallel between said first conductor and each of said endtaps; a connection between said second conductor and said midtap; first means connected to the control electrode of said paths for supplying a bias potential to the paths of each of said pairs; and second means connected to said control electrode for supplying a potential to counteract said biasing potential to fire said paths in a predetermined order; said first means being adapted to supply a higher biasing potential to the one path of each pair that fires the latest in said order than to the others and said second means being adapted to supply substantially equal counteracting potentials to all said paths.

13. In combination a highly inductive reactive transformer having a primary having in electrical effect a midtap and a pair of endtaps; a first conductor; a second conductor; a pair of electric discharge paths each defined by an anode and a cathode and having a control electrode associated with each said endtaps; means for connecting said anodes and cathodes of each pair in anti-parallel between said first conductor and each of said entaps; a connection between said second conductor and said midtaps; first means connected to said control electrodes for supplying a bias potential to the paths of each of said pairs; and second means connected to said control electrode for supplying potential pulses to counteract said biasing potential at successive instants to fire said paths in a predetermined order, said first means being adapted to supply substantially equal biasing potential to all said paths, and said second means being adapted to supply said counteracting pulses in trains, the pulses of each train being supplied to the control electrodes of the paths to be fired in the order in which they are fired at time intervals and the time interval between the first and the second pulses of any train being substantially shorter than the time interval between any succeeding odd numbered pulse and the pulse which follows it.

14. In combination a highly inductive reactive transformer having a primary having in electrical effect a midtap and a pair of endtaps; a first conductor; a second conductor; a pair of electric discharge paths consisting of an anode and a cathode and having a control electrode associated with each of said endtaps; means for connecting said anodes and cathodes of each said pair in anti-parallel between said first conductor and each of said endtaps; a connection between said second conductor and said midtap; first means connected to said control electrodes for supplying a bias potential to the paths of each of said pairs; and second means connected to said control electrode for supplying a potential to counteract said biasing potential to fire said paths in a predetermined order; said first means being adapted to supply substantially equal biasing potential to all said paths, and said second means being adapted to supply a counteracting potential to the one of the paths of each said pairs which is to fire last in said order, which counteracting potential, at corresponding instants in the positive anode-cathode half periods of said supply, is lower than the counteracting potential supplied to the other of said paths of each of said pairs at the same corresponding instants during their respective positive half periods of anode-cathode potential.

15. In combination a first plurality of terminals; a second plurality of terminals, each of said last-named terminals corresponding to a terminal of said first plurality; a pair of electric discharge paths each consisting of an anode and a cathode and having a control electrode associated with each terminal of said first plurality and the corresponding terminal of said second plurality; means connecting the anodes and cathodes of each said pair in anti-parallel between the associated terminal of said first plurality and its corresponding terminal of said second plurality; a firing circuit connected to the control electrode of each of said paths for firing said paths in a predetermined succession; means including potential supply means and a first impedance connected to the firing circuits connected at least to the last of said pairs to fire in said succession for supplying through said impedance a blocking potential to the control electrodes of the paths of said one of said pairs to block the firing of said last-named paths, said first impedance absorbing a portion of the potential from said potential supply; and means including potential supply means and a second impedance of substantially larger magnitude than said first impedance connected to the firing circuit to the others of said pairs for supplying through said second impedance a potential to the control electrodes of the others of said pairs to block the firing of the paths of the others of said pairs, said second impedance absorbing a portion of the potential from said last-named potential supply means depending on its magnitude.

References Cited in the file of this patent

UNITED STATES PATENTS

| Number | Name | Date |
|---|---|---|
| 1,995,175 | Gill | Mar. 19, 1935 |
| 2,200,077 | Dawson | May 7, 1940 |
| 2,215,313 | Alexanderson | Sept. 17, 1940 |
| 2,228,412 | Slepian | Jan. 14, 1941 |
| 2,256,293 | Salzberg | Sept. 6, 1941 |
| 2,276,752 | Willis | Mar. 17, 1942 |
| 2,473,915 | Selpian et al. | June 21, 1949 |
| 2,474,867 | Sciaky | July 5, 1949 |
| 2,510,652 | Parsons et al. | June 6, 1950 |
| 2,614,240 | Bivens | Oct. 14, 1952 |